Dec. 18, 1951      R. B. MORAN, JR      2,578,939

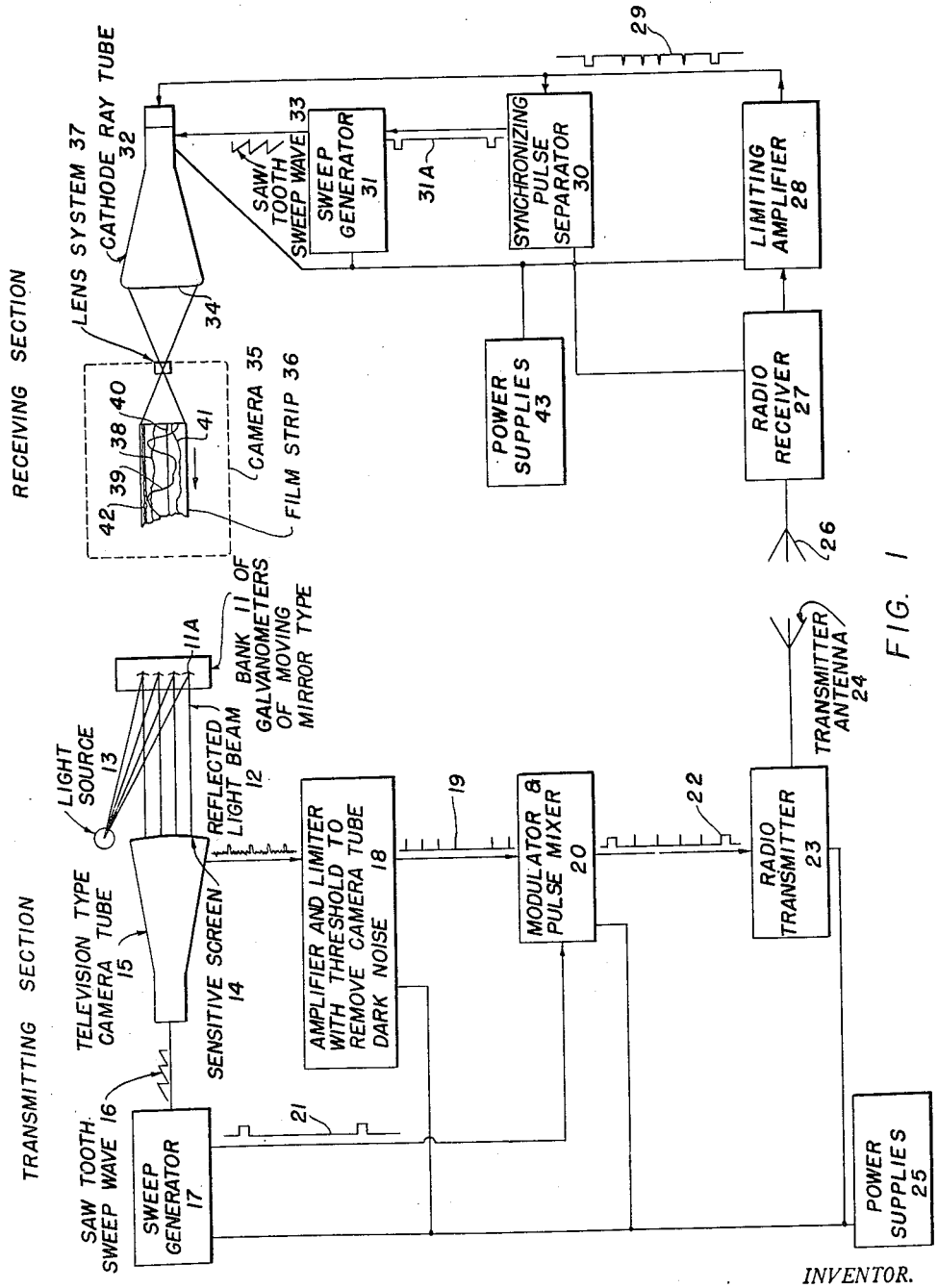

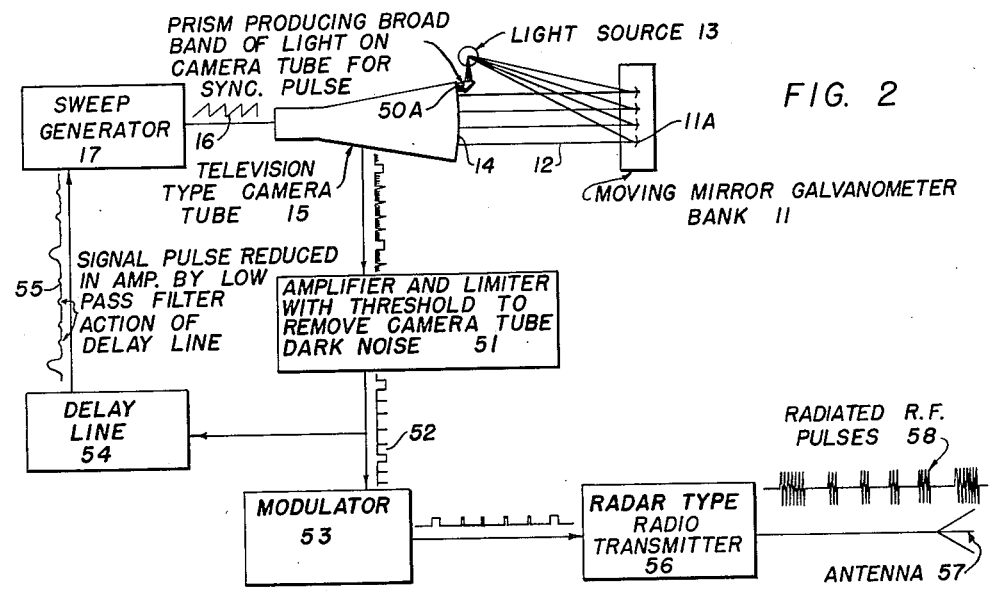
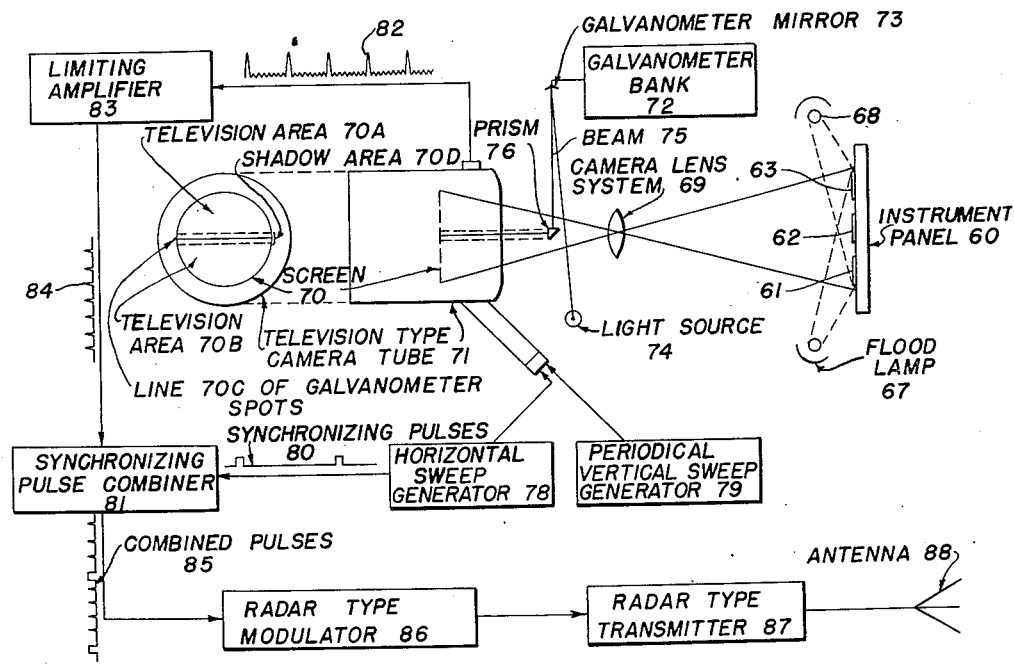

TELEMETERING

Filed March 1, 1948      5 Sheets—Sheet 3

INVENTOR.
ROBERT B. MORAN, JR.
BY
*James B. Christie*
ATTORNEY

Dec. 18, 1951        R. B. MORAN, JR        2,578,939

TELEMETERING

Filed March 1, 1948        5 Sheets-Sheet 4

INVENTOR.
ROBERT B. MORAN, JR.

BY
*James B. Chapin*
ATTORNEY

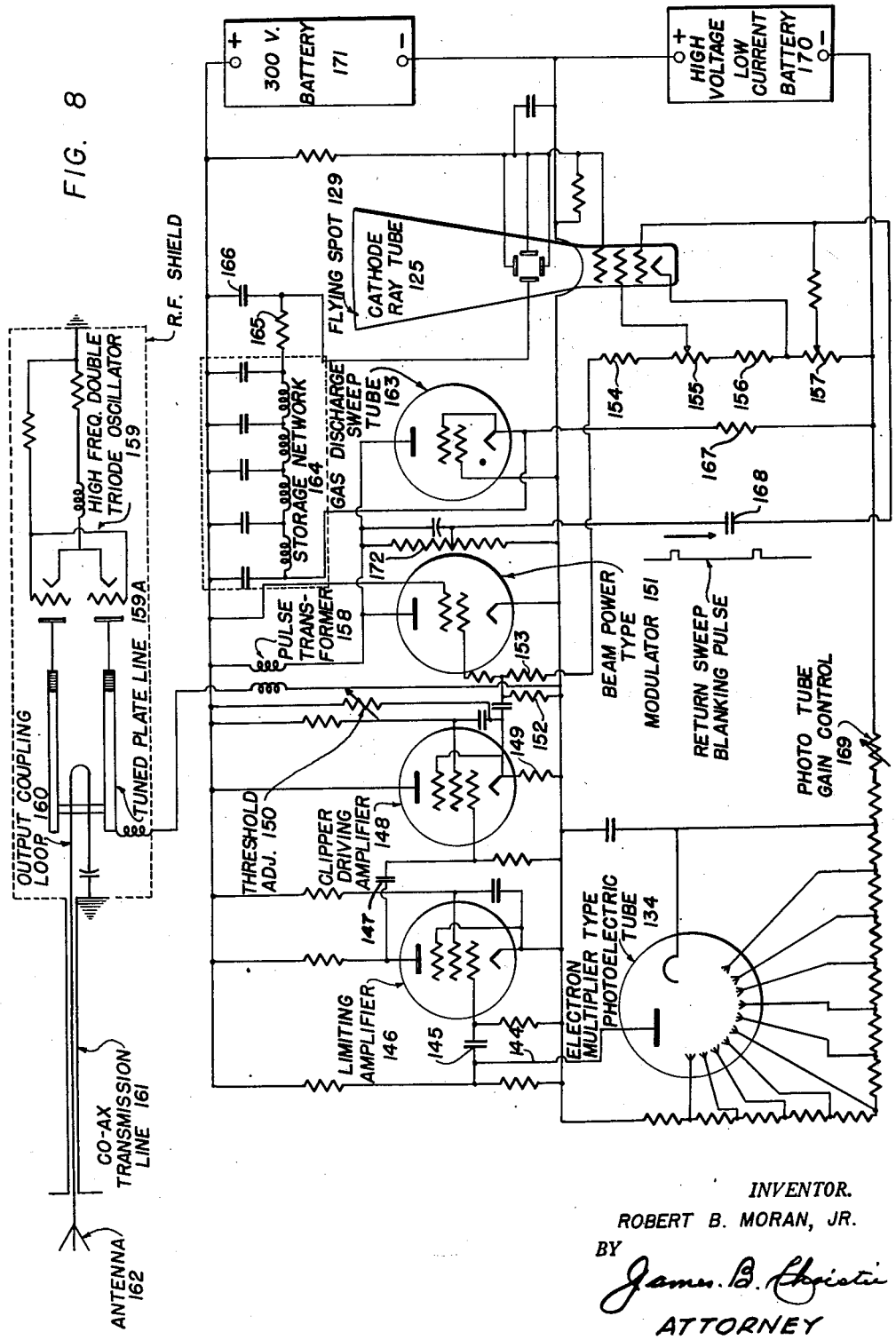

Patented Dec. 18, 1951

2,578,939

UNITED STATES PATENT OFFICE 2,578,939

TELEMETERING

Robert B. Moran, Jr., Pasadena, Calif., assignor to Moran Instrument Corporation, Pasadena, Calif., a corporation of California Application March 1, 1948, Serial No. 12,387

8 Claims. (Cl. 177—351)

This invention is concerned with telemetering, i. e. the transmission of information such as that indicated by a meter to a remote reception and observation point. In the practice of the invention, optical images which represent measurements are converted to electrical signals which are transmitted by radio or other communication medium to a distant location, where the signals are decoded and recorded or observed. In one aspect of the invention electrical signals which represent measurements are converted to optical images, re-converted to electrical signals, transmitted, decoded and observed or recorded. In another aspect, pressure measurements, mechanical motions or the direct images of dials or counters showing the desired measurements are treated in similar fashion. The invention is particularly useful in the telemetering of information from missiles, aircraft, etc. in flight and provides improved methods and apparatus for such work.

It has been proposed heretofore to transmit information by pulse position modulation and to decode the resulting signals by means of cathode ray tubes and moving film cameras and some success has attended the application of this method. It has also been proposed to telemeter the images of dials and meters by conventional television techniques, but such proposals have met with difficulty in practice because transmission by radio of a signal of such a complex nature is difficult, especially if the space relationship between the transmitter and the receiver is changing during the interval that the signal is being transmitted. This is the case in most telemetering applications, for example with missiles, drone aircraft, etc. Moreover, the equipment to generate the required complicated wide band amplitude modulated signal is excessively complex for operation at an unattended location (say in a rocket) and the radio transmission link may introduce bad distortion due to fading and multipath transmission.

Electro-mechanical oscillographs are excellent devices for measuring rapidly changing quantities such as strain, stress, acceleration, velocity, temperature, pressure and electric currents. They have been used extensively for recording changes in such quantities measured in aircraft in flight, the record being made in the aircraft. The sensitive galvanometer elements in these electro-mechanical oscillographs are low impedance electrical devices and many satisfactory drivers are now available for energizing these low impedance galvanometer elements. The drivers, however, are not in general, satisfactory for prior telemetering systems which require a higher voltage signal input than is produced directly from most of these drivers. This means that additional amplifiers must be added, increasing the complication of the system and the source of error. In the telemetering system of this invention any commercial galvanometer element may be used at the transmitter to produce the required movable optical image. Hence any driving means that will drive an electro-mechanical oscillograph can be used to drive the telemetering transmission equipment directly. In short, the invention permits the use of thoroughly developed electro-mechanical oscillographs as the primary measuring equipment in missiles, etc. in flight and the telemetering of the measurements to a ground station with less complicated equipment and with increased accuracy and reliability.

The foregoing and other benefits may be obtained in a telemetering operation, in accordance with my invention, as follows:

A change in quantity being measured is transduced into an optical image, moved along a line at a rate corresponding to the change in the quantity, for example by projecting a light beam from a moving galvanometer mirror along the line. The line is scanned repeatedly according to a predetermined scanning cycle. For example, the optical image may be caused to move along a line on the sensitive screen of a television type camera tube and an electron beam is caused to sweep along this line to accomplish the scanning. By scanning there is produced a series of separate electrical signal unidirectional pulses (i. e. all of the same sign) corresponding to the repeatedly scanned image. Correlating or timing pulses, each corresponding to the same point in the scanning cycle and of the same sign as the signal pulses, are interspersed with these signal pulses, for example, by focusing a stationary light beam on the line. The resulting series of pulses is transmitted by pulse modulation to a remote receiving section, for example, by radio, and at the receiving section the pulse series is decoded through the aid of the correlating or marker pulses, preferably by techniques described in detail hereinafter. The decoded information is recorded, preferably on a moving film. In this fashion an oscillograph record can be produced at the receiving section which is essentially the same as one that would be produced by causing the original image (say a light spot) at the transmitting section to move across a film which is moved transversely to the direction of movement of the image. These and other aspects of my invention will be understood more thoroughly in the light of the following detailed description of presently preferred practices, taken in conjunction with the accompanying drawing in which:

Fig. 1 is a block diagram of one form of telemetering apparatus constructed in accordance with my invention and provided with both transmitter and receiver sections;

Fig. 2 is a block diagram illustrating a modified form of the transmitter section of Fig. 1;

Fig. 3 illustrates a still further modification of the transmitter of Fig. 1 which permits the production at the receiver of a facsimile of complex images such as dial faces, etc., the information represented by the facsimile being telemetered over the same transmission linkage, say radio, as that employed for oscillographic information;

Fig. 8 is a wiring diagram of a complete transmitter circuit employing the scanning system illustrated in Fig. 7.

Figure 5:
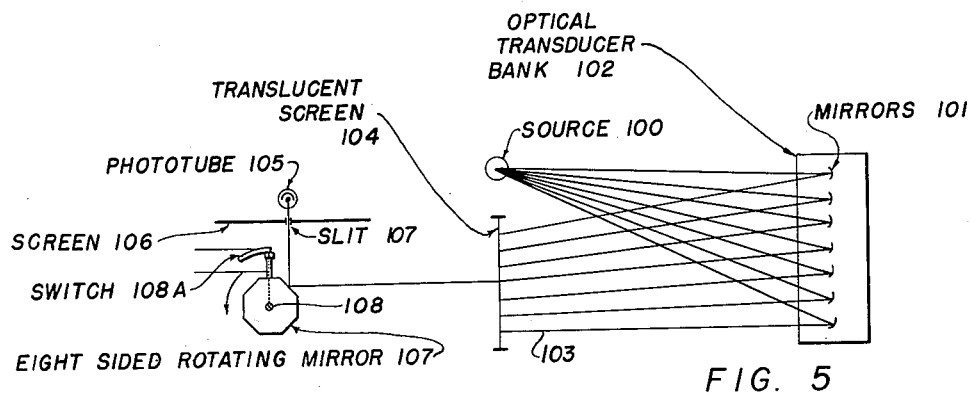
Fig. 5 illustrates a mechanical scanning system suitable for use in a transmitter section constructed in accordance with my invention and adapted to transmit low frequency signals at a relatively low sampling rate.

To consider the apparatus of Fig. 1, a plurality of low frequency electrical signals which are desired to be telemetered are fed respectively to conventional oscillograph type galvanometers of the moving mirror type disposed side by side in a bank 11. The galvanometers may be driven by any desired measuring apparatus, say by vibration pickups or strain gauges. Light beams 12 from a suitable light source 13 are reflected from the galvanometer mirrors 11A and focused in a line of points or narrow wedges on the sensitive screen 14 of a television type camera tube 15 in the same manner as they are focused on the moving record film in a conventional recording oscillograph. An electron beam produced in the camera tube is caused to sweep along the line of points on the screen of the tube by a conventional linear saw-tooth sweep wave 16 sent to the camera tube by a sweep generator 17. The output of the camera tube is amplified and clipped to a predetermined uniform amplitude level in a high gain limiting amplifier 18. Thus the amplified output of the camera tube forms a string of sharp pulses 19 of constant amplitude and whose spacing with time is proportional to the positions of the galvanometer spots (image) on the screen of the camera tube.

As the galvanometer light spots move back and forth across the line on the camera tube screen in accordance with the signal currents which are being measured by the galvanometers, the time spacing of the pulses 19 in the amplifier output will also be changed proportionally. When the light spots cross each other, the corresponding pulses will also cross each other and the pulse time spacing will still accurately represent the spot spacing, no matter where the spots travel on the line which is being swept by the electron beam.

The clipped pulse output of the amplifier is used to modulate a high frequency radio or micro wave transmitter. Hence the string of pulses 19 are fed directly to a conventional pulse type modulator 20 which also serves as a mixer, receiving synchronizing pulses 21 from the sweep generator. These pulses are of longer duration than those from the amplifier, so that they may be distinguished easily and are produced by the sweep generator in synchronism with the movement of the electron beam. For example, they may be produced at the beginning of every sweep of the electron beam so that they serve as "frame markers" or reference points for the pulses sent out by the amplifier. The modulator output thus consists of the sharp clipped pulses from the amplifier (which represent the instantaneous values of the functions being measured respectively by the galvanometers) interspersed with the longer pulses which serve as frame markers—as indicated by the wave form 22. The modulator output goes to a transmitter or oscillator 23 (say one of radar type) which sends out corresponding signals from the antenna 24.

The various elements of the transmission section described above, including the sweep generator, the amplifier, the modulator and the transmitter are energized by conventional power supplies 25 indicated diagrammatically on Fig. 1.

Signals from the transmitting antenna 24 are received through an antenna 26 of a radio receiver 27 which forms part of a receiving section, for example, a ground station. Thus the transmitted energy pulses are reconverted into electrical pulses to operate a recording means.

The radio receiver feeds a conventional limiting amplifier 28, the output of which is a string of pulses 29 corresponding to the pulse string 22 and consisting of sharp pulses representing instantaneous galvanometer positions interspersed with the longer frame marker pulses. These latter pulses are sorted out in a synchronizing pulse separator 30 by integrating and pedestaling techniques such as those employed in television and the sorted pulses are employed to control a sweep generator 31 of a cathode-ray tube 32. Thus the sweep generator 31 is fed by a string 31A of the marker pulses and produces a saw tooth sweep wave 33 synchronized exactly with the sweep wave 16 of the sweep generator in the transmitter section.

The unsorted string of pulses 29 is also fed to the beam control grid of the cathode-ray tube, which normally is at cutoff. During each pulse the beam is turned on momentarily to produce a spot on the fluorescent screen 34 of the cathode-ray tube. The spots thus produced cross a line on the cathode-ray tube corresponding to the line on the screen of a camera tube and are photographed continuously by a camera 35 having a longitudinally moving film strip 36 and a lens system 37 through which the spots are focused on the film. The result is a series of oscillograph traces 38, 39, 40, 41 on the film, this record being essentially the same as that which would be produced if the film were drawn past the galvanometer spots where they fall on the camera tube in the transmitting section. The marker pulses are registered as a straight broad band 42 at the edge of the film.

Conventional power supplies 43 energize the receiver, amplifier, pulse separator, sweep generator, and cathode-ray tube in the receiving section.

The entire transmitting section may be mounted in a missile, aircraft or the like, and its bank of galvanometers may be driven by any appropriate driving elements, say vibration pickup equipment, strain gauges, thermocouples, accelerometers, etc. Moreover, a variety of other means may be employed to move a light beam across the line of the camera tube, including sensitive mechanical or hydraulic elements provided with moving mirrors which project the light beams along the line in accordance with the rate of change of the function to be measured.

The amplifier and limiter 18 in the transmitter section should be set at a threshold amplitude such that so-called camera tube "dark noise" is clipped out of the signal.

As compared to the pulse position systems used heretofore in telemetering, my invention affords great circuit simplicity. Most such systems require several additional vacuum tubes for each additional signal channel to be transmitted, whereas my system requires only an additional galvanometer or its equivalent. Thus any mechanical strain gauge or pressure sensing element which can be made to move a light beam across the line that is scanned, can be employed to feed a signal directly into the transmitter section.

If desired, a shadow system such as a string galvanometer can be employed to feed the transmitter section, and an additional tube placed in the clipping amplifier to reverse the polarity of the output pulse. The usual mechanical light beam interruption system of trace identification which is used in oscillographs can be used in the transmitter camera, or different widths or double spots can be used for identification.

Fig. 2 illustrates a modification of the transmitter section of Fig. 1 in which the frame marker pulses of longer duration are produced directly by the camera tube in the transmitter section. The apparatus elements common to Figs. 1 and 2 are indicated respectively by the same reference characters. The light from the source 13 is reflected as beams 12 by the moving mirrors 11A of the galvanometer bank 11 onto the sensitive screen 14 of the television type camera tube 15. Thus images in the form of light spots are moved back and forth along a line on the camera tube parallel to the plane of the drawing. By using cylindrical or parabolic galvanometer mirrors, the images may take the form of sharp lines normal to the plane of the drawing.

A prism 50 receives light from the source and produces a broad band of light 50A on one side of the camera tube normal to the plane of the drawings (the upper side as shown in Fig. 2).

The sweep generator 17 is employed to move the electron beam back and forth across the sensitive screen of the camera tube (up and down in the plane of the drawing Fig. 2). As the beam is moved, a sharp pulse is produced in the output of the camera tube for each galvanometer spot or line and a long marker pulse is produced when the broad band of light from the prism is swept. The output of the camera tube therefore has a wave form with sharp galvanometer pulses interspersed with longer marker or frame pulses.

The output of the camera tube is amplified and clipped on both top and bottom and limited by the overdriven threshold amplifier 51. The threshold of this equipment is set to remove camera tube dark noise. The output pulses from the camera tube are thus sharpened and shaped, while any background noise that is present is eliminated. The shape of the amplifier output wave is indicated at 52.

The output wave of the amplifier is fed to a micro wave modulator 53 and through a delay line 54 to the sweep generator. The delay line establishes the length of the synchronizing pulse and also acts as a low pass filter which can be made to discriminate against the short signal pulses representative of the galvanometer spots. Consequently it tends to emphasize the longer synchronizing pulses representative of the stationary beam on the prism. The output of the delay line takes the wave form 55 and goes to the sweep generator to synchronize the sweep of the electron beam in the camera tube. In short, only the delayed longer synchronizing pulses are used to synchronize and reset the sweep.

The rest of the apparatus of Fig. 2 comprises a radar type radio transmitter 56 with an antenna 57 from which radiated R. F. pulses having the wave form 58 are sent to the receiving section. This receiving section can be constructed exactly as shown in Fig. 1 and its operation is the same as described with reference to that figure.

Some of the information to be telemetered from rockets, aircraft, etc., in flight does not change rapidly and only needs to be sampled or determined occasionally during a test. A current practice for telemetering this type of information is to mechanically switch or commutate one or more high speed channels between a number of slow changing channels. This mode of operation can also be applied in the case of my invention, but frequently this slowly changing data can be more easily and more accurately represented on a mechanical dial or (when several decimal places of accuracy are required) on the type of counter which displays a changing numerical sum, i. e. the type of counter employed to measure mileage in an automobile. In accordance with my invention such mechanical dials or numbering type counters may be placed in the telemetering section. Readings on such dials or counters are then transmitted to the receiving section and reproduced in facsimile by the cathode-ray tube and the moving film camera. For reasons which will presently appear, the dials or counters are constructed with strong color contrast, say by making the pointers or the numbers white on a black background.

Fig. 3 illustrates a modification of the transmitter section of Fig. 1 adapted to transmit a facsimile of the images of black and white dial faces, etc. these images being telemetered over the same communication linkage which transmits the oscillographic information represented by the moving light spots on the line of the camera tube. Referring to Fig. 3, an instrument panel 60 having a plurality of dials or counters 61, 62, 63, is strongly illuminated from both sides by flood lamps 67, 68. The images of the dials on the instrument panel are projected through a camera lens system 69 into television areas 70A, 70B of the sensitive screen 70 of a television type camera tube 71.

A bank 72 of moving mirror type galvanometers (one mirror 73 being shown) is disposed out of the path of the light beams from the instrument panel. Light from a source 74 strikes the mirror and is reflected back as a beam 75 through an elongated prism 76 to strike on the screen of the camera tube. Thus, a series of moving galvanometer spots are moved back and forth along a line 70C on the screen of the camera tube exactly as in the case as of the transmitter section of Fig. 1. However, in addition, the two dimensional image of the dial faces on the instrument panel is projected onto the television areas 70A, 70B of the camera tube screen, but not on the shadow area 70D which encompasses the galvanometer spot line 70C and is in the shadow of the prism 76.

A conventional sweep generator 78 is employed to move the electron beam in the camera tube back and forth along the line 70C of galvanometer spots. For convenience this sweep generator is designated as the "horizontal sweep generator." There is also another sweep generator 79, referred to for convenience, as the "periodical vertical sweep generator," which periodically causes the electron beam to sweep transverse to the galvanometer spot line while the "horizontal" scanning continues, thereby scanning either or both of the television areas 70A, 70B on which the image of the instrument panel is projected.

A string 80 of synchronizing pulses is produced by the horizontal sweep generator, say one pulse for each complete sweep of the electron beam in the direction of the line of galvanometer spots. This string of marker pulses is fed to a synchronizing pulse combiner 81 such as that employed in television apparatus.

The output of the camera tube, having a wave form 82 is sent to a limiting amplifier 83 constructed as described in connection with Fig. 1. This limiting amplifier clips both the top and bottom of the wave to produce a wave of form 84 at its output. This wave goes to the synchronizing pulse combiner 81 where it is interspersed with the synchronizing pulses from the horizontal sweep generator, the output of the combiner being a wave of form 85 which is sent to a radar type modulator 86. This modulator feeds a radar type transmitter 87 which sends out signals over a transmitting antenna 88 precisely as described in case of the apparatus of Fig. 1.

It will be seen that the apparatus of Fig. 3 contains the same elements as that of Fig. 1 and is arranged to transmit the same type of signals from a galvanometer bank, with the same longer frame pulses. However, the apparatus (due to the introduction of the instrument panel, the camera lens system, and the periodical vertical sweep generator) is also adapted at predetermined intervals to interrupt the transmission of information from the galvanometer bank and instead transmit a facsimile image of the instrument panel. In other words, a periodic transverse sweep is introduced into the camera tube while the so-called horizontal sweep functions continuously. The electron beam, therefore, periodically scans the areas where the image of the instrument panel is projected on the face of the camera tube and then returns to the continuous scanning of the line of galvanometer spots, where it continues to sweep until the next period for investigating the readings of the dials occurs.

As shown, the face of the tube may be divided into two or more television areas or zones, and these may be scanned on different schedules. This is useful when some of the slowly changing functions represented by dial or counter readings should be determined oftener than the data represented on other dials or counters.

If desired, the transverse sweep may be so adjusted that periodically the electron beam is moved transversely to a second line parallel with the first line of galvanometer spots and along which information is being indicated continuously by another set of galvanometers or the like. Thus a second bank of galvanometers may be disposed so that their light spots move along the second line continuously, the positions of these spots being transmitted only intermittently.

When a large number of galvanometers or the like are employed to move light spots along lines on the sensitive surface of a camera tube in the transmitter section, more efficient use of the sensitive surface is obtained if the galvanometers are arranged in a plurality of banks, say three, which reflect images respectively along parallel lines on the surface of the tube, means being provided for scanning the lines in sequence. The apparatus of Fig. 1 may be modified to accomplish this result by providing the additional galvanometer banks arranged as described above together with a stair-step counter which serves as a "vertical" sweep generator. In such an arrangement the sweep generator 17 of Fig. 1 which may be considered as the "horizontal" sweep generator, makes three sweeps for each frame or marker pulse sent to the camera tube. Its saw-tooth sweep wave is sent to the stair-step counting circuit. This circuit counts the "horizontal" sweep waves and is so arranged that at the termination of the first horizontal sweep wave its output voltage rises stepwise and deflects the electron beam transversely from the first line of galvanometer spots to the second line of spots. At the termination of the second horizontal sweep wave, the voltage again rises abruptly by another step, so that the electron beam scans the third line. At the termination of the third horizontal sweep, the counter circuit automatically resets so that the beam is returned to the first line and simultaneously generates a marker pulse which is sent to the modulator and pulse mixer 20. Several conventional counter circuits can be used to produce this action.

The above described stair-step transverse scanning system has the advantage of using the camera tube screen effectively without introducing any complications in the receiving section of the system. However, it has the disadvantage of limiting image motion to the one line in which it appears.

The introduction of periodic transverse scanning by the periodical vertical sweep generator requires no further complication either in the transmitter section or the receiver section. No transverse synchronizing pulses are needed. When a facsimile of the instrument panel or a record from the second line of galvanometer spots is to be recorded the continuous oscillograph record of the moving spots on the first line is simply broken and a facsimile of the dials or spots of the second line is projected by the cathode ray tube in the receiver section and appears on the record film in that section. The transverse sweep of the camera tube in the transmitter section should be made at approximately the same speed at which the film runs in the camera of the receiving section, but exact synchronism is not required. For example, if the film speed differs from the transverse sweep speed by 10%, the aspect ratio of the facsimile picture of the instrument panel is distorted 10%, but the dials are still readable to the same accuracy.

Figure 4:
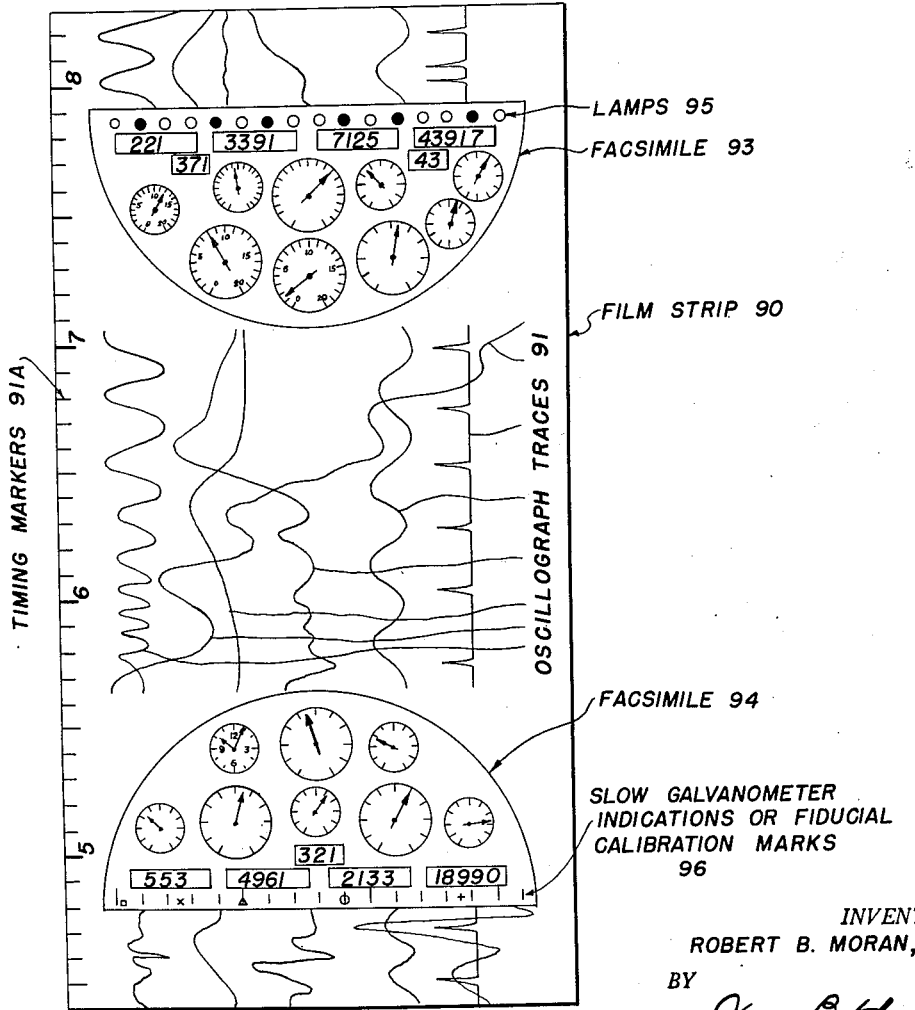
Fig. 4 is a sample of the type of record which may be telemetered from the apparatus of Fig. 3.

Fig. 4 shows the form of record which may be produced with a transmitter section constructed in accordance with Fig. 3 and a receiver section such as that of Fig. 1. The record comprises a film strip 90 upon the side of which timing markers 91A appear, these being put on at the camera in the receiving section by well established techniques, such as those employed in recording seismograph records in geophysical exploration practice. Rapidly changing oscillograph traces 91 are recorded on the film as a result of the action of the moving galvanometer spots at the camera tube, as previously described in relation to Fig. 1. Periodically, however, the oscillographic traces are interrupted to produce facsimiles 93, 94 of those portions of the instrument panel projected respectively on the television areas of the screen of the camera tube in the transmitter section. By transversely scanning periodically the two areas on different schedules the instrument panel sections may be reproduced at different rates. Thus, if desired, one half of the panel may be reproduced twice as often as the other.

The instrument panel should be arranged so as to employ the television areas as efficiently as possible. If the television screen is circular in plan, a circular panel, such as that indicated on Fig. 4 is desirable, with the dials, counters, lights, etc., arranged so that their images do not face on the shadow area blocked by the prism.

A row of lamps 95 for indicating "yes or no" information or binary count data may be placed on the instrument panel and reproduced as shown in the facsimile 93. Moreover, slow galvanometer spots and fiducial calibration marks may be reproduced as shown at 96 on the other facsimile of the instrument panel.

The lamp banks may be reproduced in facsimile without necessarily reproducing the rest of the instrument panel by adjusting the transverse scanning. In either case the lamp bank can be employed to give a periodic indication of "on-off" information indicated by the lights, or a number of lights may be employed to indicate a variable in stepwise fashion. When a simple oscillographic system is employed with no transverse sweep this latter type of information may be introduced on the record by allowing the lamps to trace fiducial lines thereon to indicate, for example, the open or closed condition of certain circuits in the transmitter section.

Since the clipping amplifier trims all of the pulses coming from the camera tube to the same amplitude, whether these pulses represent the galvanometer spots or the image of the instrument panel, the facsimile of the latter will be in strong contrast, with no half tones. Consequently the instrument panel should not depend upon any half tones for indications and should be in strong two color contrast, preferably black and white. Strong illumination of the panel helps to assure proper transmission.

In the practice of the invention, it is not necessary to employ an electronic type scanning system. A simple mechanical system may be employed in the transmitter section, for example when this is mounted in a rocket and flown to destruction. Such a mechanical scanning system for use in the transmission of low frequency signals at a comparatively low sampling rate is shown in Fig. 5. In this apparatus, light from a source 100 is beamed to cylindrical or parabolic mirrors 101 of galvanometers or the like in an optical transducer bank 102. Light from the mirrors is reflected as a series of moving narrow lines 103 (normal to the plane of the paper in Fig. 3) back and forth across an optical image plane, for example a translucent screen 104.

A conventional phototube 105 is provided with an opaque screen 106 immediately in front of it. This screen has an optical slit 107 parallel to the lines of light on the translucent screen. A rotating or vibrating mirror 107 is disposed between the optical slit and the translucent screen with its axis 108 of movement parallel to the slit and the moving light lines. As this mirror is rotated or vibrated it repeatedly scans the series of image lines produced on the translucent screen so that the photocell looking through this slit sees the light spots on the screen in rapid succession. The output of the photocell is a series of electrical pulses whose spacing in time represents the information which is to be transmitted.

If desired, the mirror 108 can be replaced with a rotating or vibrating prism, or a rotating or vibrating shutter can be employed to accomplish the same scanning action. The rotating mirror, prism, or shutter can of course, be motor driven. A vibrating mirror, or prism, or shutter can be driven by a galvanometer or through a cam system.

In the case of the apparatus of Fig. 5, the pulses from the phototube are mixed with marker pulses, produced, for example, with a mechanical switch 108A on the rotating mirror shaft 108 of Fig. 5. The resulting signal is transmitted to the receiving section and decoded and recorded as already described with reference to Fig. 1.

Figure 6:
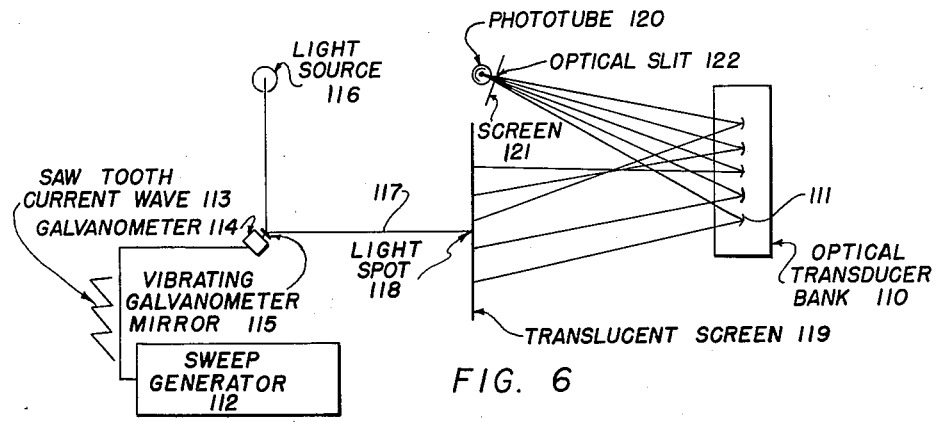
Fig. 6 illustrates another mechanical scanning system of my invention which employs a "flying" light spot.

Another scanning system for use in the practice of my invention is shown in Fig. 6. This system employs a flying spot technique. In Fig. 6 an optical transducer bank 110 (like that of Fig. 1) is provided with a number of galvanometers with moving mirrors 111. A sweep generator 112 is employed to produce a saw tooth current wave 113 which is fed to a galvanometer 114 having a vibrating galvanometer mirror 115. Light from a source 116 is beamed on this galvanometer mirror and reflected as a beam 117 to produce a moving light spot 118 on a translucent screen 119 which acts as an optical image plane. The mirrors 111 of the galvanometers in the optical transducer bank see the light spot through the translucent screen. Each galvanometer mirror of the transducer bank is moved in accordance with a function to be measured, say by an electrical strain gauge, and reflects a beam of light to a phototube 120 provided with an opaque screen 121 disposed in front of it and having an optical slit 122 through which the light enters the phototube.

This system of Fig. 6 is similar to that of Fig. 5, except that the positions of light source and photocell are reversed. In the system of Fig. 6, a light spot is caused to sweep repeatedly across the translucent screen 119 by reason of the action of the sweep generator which vibrates the galvanometer 114 and its mirror 115. The photocell 120 sees one point in the line of sweep in each of the transducer mirrors 111. Hence as a transducer mirror moves around an axis normal to the plane of the drawing, the spot on the screen which the photocell sees in this mirror also moves. As the scanning spot passes across the translucent screen, it is reflected by each of the galvanometer mirrors 111 with the result that a series of electrical impulses are generated by the photocell.

If it is desired to increase the optical efficiency of the apparatus of either Fig. 5 or Fig. 6, the translucent screen may be replaced with a lens system which forms an optical image plane.

The impulses from the phototube of Fig. 6 are transmitted, received, and recorded precisely as in the case of the apparatus of Fig. 1.

Figure 7:
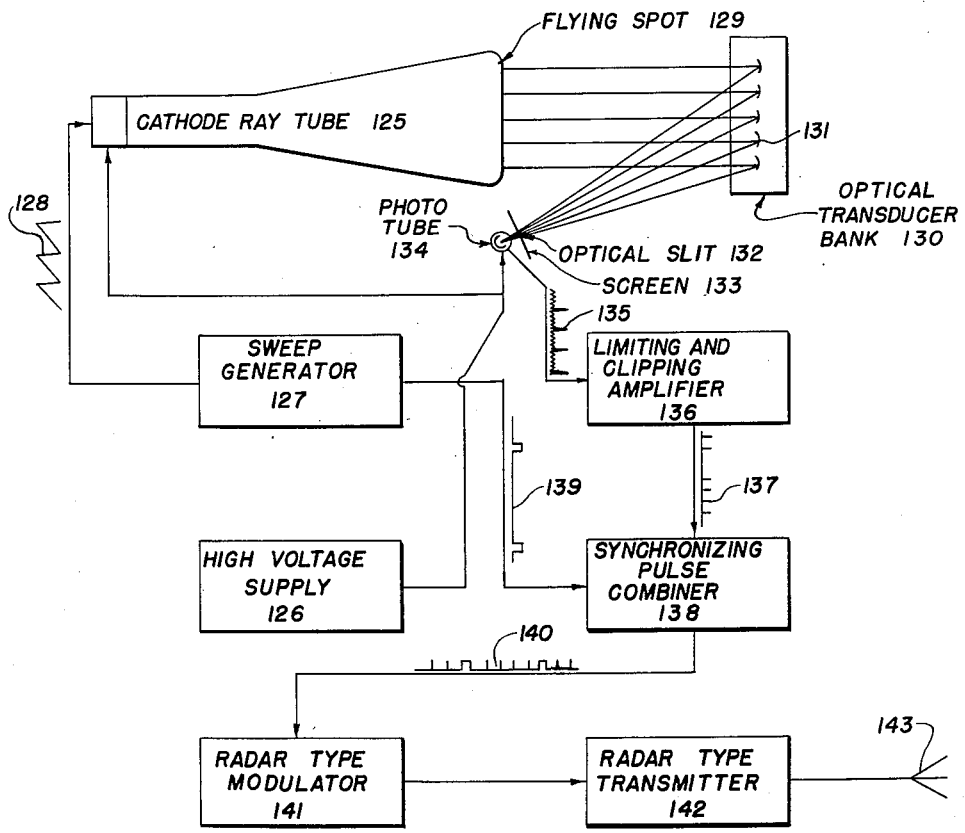
Fig. 7 illustrates still another scanning system of my invention employing a so-called "flying spot" on a cathode-ray tube.

Fig. 7 illustrates an electrical scanning system for the practice of my invention employing a flying spot on a cathode-ray tube. This cathode-ray tube replaced the vibrating galvanometer mirror 115, the light source 116 and the translucent screen 119 in Fig. 6. Thus, a cathode-ray tube 125 powered by a high voltage supply 126 is controlled by a sweep generator 127 which produces a saw tooth current wave 128. The energized tube under the influence of the sweep generator 127 produces a flying light spot 129 which sweeps back and forth on the sensitive screen of the cathode-ray tube. An optical transducer bank 130 provided with a plurality of mirrors 131 moved by galvanometers or the like (not shown) on axes normal to the plane of the paper are disposed in front of the screen of the cathode-ray tube so that they see the flying spot and reflect its image through an optical slit 132 in an opaque screen 133 to a phototube 134, the latter likewise being energized by the high voltage supply 126. As in all the former cases, the output of the phototube consists of a series of sharp pulses 135 representative of the positions of the galvanometer mirrors 131 and this output is sent to a limiting and clipping amplifier 136. The clipped output 137 of this amplifier goes to a synchronizing pulse combiner 138 which is also fed with marker or synchronizing pulses 139 from the sweep generator 127. The result of this action is the production of a string of pulses 140 which go from the synchronizing pulse combiner to a radar type modulator 141 to be transmitted to a radar type transmitter 142 provided with an antenna 143.

The system of Fig. 7 furnishes the same advantages of unlimited sampling rate that is obtainable with the television type camera tube illustrated in Fig. 1. It has the further advantage of lower cost.

Although various types of phototubes may be employed in the apparatus of Figs. 5, 6 and 7, an electron multiplier phototube is preferable. This type of tube has advantages of increased sensitivity and higher response speed as compared with older types.

Circuit details of the apparatus illustrated in the block diagram of Fig. 7 are shown on Fig. 8.

The optical system for the apparatus of Fig. 8 is the same as that of Fig. 7. The flying spot 129 is caused to scan across the fluorescent face of the cathode-ray tube 125. Whenever the flying spot passes one of the image points of the phototube slit, these image points being focused on the face of the tube by the galvanometer mirrors 131, light pulse enters the phototube 134 and a negative voltage pulse appears at its anode. As shown in Fig. 8, the phototube is of the electron multiplier type.

The negative pulse which appears at the anode of the phototube is passed to the grid of a limiting amplifier 146 by a coupling condenser 145. The limiting amplifier preferably is a high gain pentode (as shown) and is normally heavily conducting, being operated with its grid at zero bias. The imposition of a negative pulse on the grid of the limiting amplifier tube produces a sharp positive pulse on the anode of this tube. This sharp positive pulse is clipped and limited at its top by the pentode itself due to the cut-off condition of the tube during the peak of its negative grid pulse. The clipped positive pulse at the anode of the pentode amplifier is passed to the grid of a second pentode 148 by a coupling condenser 147. The pentode 148 is a clipper amplifier which is normally held at cut-off by the current which flows through its cathode resistor 149 and a threshold adjusting rheostat 150 which controls the amount of negative bias on the grid of this clipper amplifier pentode.

The negative bias on the clipper amplifier tube is made sufficiently negative so that none of the dark current noise from the phototube 134 appears at the cathode of the clipper amplifier 148. When a positive pulse appears at its grid, the clipper amplifier conducts and the positive pulse appears at its cathode with all of the noise background removed from the base of the wave.

The cathode of the clipper amplifier is a low impedance source and hence is employed to drive a class "C" amplifier 151 directly. This class "C" amplifier comprises a beam power amplifier tube which is normally cut-off by its grid connected to a negative bleeder string of resistors 152, 153, 154, 155, 156, 157.

When a positive pulse at its grid causes the beam power tube 151 to conduct, it draws a heavy pulse of current through a pulse transformer 158, thus feeding a high voltage pulse to the plate line 159A of a high frequency oscillator tube 159. This latter is a conventional V. H. F. double triode oscillator having a high "Q" resonant plate line and receiving its positive feed-back through interelectrode capacity.

When the oscillator tube receives the positive pulse on its plate it will oscillate at the natural frequency of its plate line and will feed R. F. power from an output coupling loop 160 through a co-axial transmission line 161 to an antenna 162, from which it is radiated.

A storage network 164 and another condenser 166 are charged toward negative supply through a resistor 167, and a gas discharge tube 163 is employed for sweep purposes, i. e. by resetting the sweep and generating the marker pulse. When the cathode of this tube reaches a potential near that of its grid, the tube fires and discharges the storage network 164 through a pulse transformer 158. This produces a long marker pulse. The primary of the pulse transformer serves to combine the marker pulses and the signal pulses from the phototube 134.

The length of the marker pulse is determined by the electrical length of the network $$2\sqrt{LC}$$

The network 164 is designed to have a surge impedance which matches the load presented by the oscillator 159 through the transformer 158.

The network 164 is charged through a small percentage of the total voltage of the negative supply, so its charging rate is quite linear. Consequently a linear sweep voltage is produced. This is used to sweep the cathode-ray tube through a filter or integrating network 165, 166 which removes any step charging ripple of the storage network from the sweep fed to the cathode-ray tube.

The cathode-ray tube is operated in conventional manner and is supplied with high negative voltage by a high voltage supply 170 which also supplies high voltage through a gain control rheostat 169 to the phototube.

The focus and intensity of the electron beam in the cathode-ray tube are adjusted by moving the sliders of the resistors 155, 157 which are really potentiometers.

If desired, the electron beam of the cathode-ray tube may be blanked out on the return trace by coupling its grid to the plate of the gas discharge sweep tube 163 through a coupling condenser 168 and a voltage divider 172.

The circuit shown in Fig. 8 is, in general, suitable for a transmitting section employing a camera tube instead of a cathode-ray tube. However, the limiting amplifier in such case requires considerably higher gain because of the lower sensitivity of the camera tube.

The circuit contains appropriate bias resistors and coupling condensers other than those described above, together with a 300 volt battery 171. Their functions will be apparent from the consideration of the circuit diagram.

The operation of the apparatus of Fig. 8 is as follows: The flying spot on the cathode-ray tube through optical connection with the phototube produces a string of pulses which are limited in the amplifier 146 with respect to height, dark current noise being clipped off in the clipper amplifier 148. The output of this clipper amplifier goes to the beam power tube modulator 151, which sends the amplified signals to the pulse transformer. The longer marker pulses are interspersed with the signal pulses. The marker pulses are the result of the action of the gas discharge sweep tube 163 and the condenser network 164.

The string of pulses from the transformer (which includes the longer marker pulses) is sent to the plate line of the high frequency double triode oscillator and sent by means of the output coupling loop to the co-axial transmission line 161 (the transmission line, output loop, plate line, and oscillator being R. F. shielded). The signal radiated by the antenna is sent to a receiving section such as that illustrated in Fig. 1 and the decoding and recording conducted as described in connection with that figure.

I claim:

1. In a telemetering transmitter, the combination which comprises transducers for moving a plurality of optical images simultaneously along the same line, the instantaneous positions of the respective images on the line corresponding respectively to the amplitudes at the same instant of respective functions being measured, the arrangement being such that the images can cross each other in moving along the line, photoelectric means for cyclically scanning the line and producing a series of separate electrical signal pulses of the same sign, the spacing of which in each scanning cycle corresponds respectively to the spacing of the scanned images on the line at the instant of scanning, means for interspersing in the series of signal pulses a series of marker pulses of different duration than the signal pulses but of the same sign and each corresponding to the same point in successive scanning cycles, and pulse modulating means for transmitting the resulting combined series of pulses as separate radiated R. F. pulses.

2. Apparatus according to claim 1 in which the photoelectric means includes a camera tube having a screen so positioned that the transducers move the optical images along the line on the screen, means for projecting on the screen of the camera tube in a zone not traversed by the line another optical image, means for periodically scanning the screen transverse to the line while continuing to scan continuously in the direction of the line to scan said other image periodically and produce periodically another series of signal pulses of the same sign but corresponding to the other image, the second series of signal pulses periodically replacing the first series of signal pulses.

3. Apparatus according to claim 1 provided with an image plane, means for cyclically scanning the line on the image plane with a flying light spot, a photocell, and optical transducer means for projecting a series of images of the flying light spot to the photocell.

4. In a telemetering system, the combination which comprises transducers for moving a plurality of optical images simultaneously along the same line, the instantaneous positions of the respective images on the line corresponding respectively to the amplitudes at the same instant of the respective quantities being measured, the arrangement being such that the images can cross each other in travelling along the line, photoelectric means for cyclically scanning the line and producing a series of separate electrical signal pulses of the same sign, the spacing of which in each scanning cycle corresponds respectively to the spacing of the scanned images on the line at the same instant in that scanning cycle, means for interspersing in the series of signal pulses a series of marker pulses of different duration than the signal pulses but of the same sign and each corresponding to the same point in successive scanning cycles, pulse modulating means for transmitting the resulting combined series of pulses as separate radiated R. F. pulses, a radio receiver for receiving and demodulating the R. F. pulses, means for reproducing along a second line successive groups of images corresponding to the successive groups of demodulated signal pulses positioned between successive marker pulses and scanning means actuated by the demodulated marker pulses for synchronizing the position of each group of images along that line with the position of the corresponding group of images on the line that is scanned by the photoelectric means, whereby the spacing between the reproduced images corresponding respectively to the several functions being measured is always proportional to the spacing between the original images on the line that is scanned by the photoelectric means.

5. In a telemetering system, the combination which comprises transducers for moving a plurality of optical images simultaneously along the same line, the instantaneous positions of the respective images on the line corresponding respectively to the instantaneous amplitudes of respective functions being measured, the arrangement being such that the images can cross each other in moving along the line, photoelectric means for cyclically scanning the line and producing a series of separate electrical signal pulses of the same sign the spacing of which in each scanning cycle corresponds respectively to the spacing of the scanned images on the line during the instant of scanning, means for interspersing in the series of signal pulses a series of marker pulses of different duration than the signal pulses but of the same sign and each corresponding to the same point in successive scanning cycles, pulse modulating means for transmitting the resulting combined series of pulses as separate radiated R. F. pulses, a radio receiver for receiving and demodulating the R. F. pulses, means for recording with respect to time a plurality of lines representing successive groups of images corresponding to the successive groups of demodulated signal pulses positioned between successive marker pulses, and scanning means actuated by the demodulated marker pulses for synchronizing the position of each group of images along a second line transverse to the plurality of lines with the position of the corresponding group of images on the line that is scanned by the photoelectric means, whereby the spacing at any instant between the recorded images corresponding respectively to the several functions being measured is always proportional to the spacing between the original images on the line that is scanned by the photoelectric means.

6. In a telemetering transmitter, the combination which comprises transducers for moving a plurality of optical images simultaneously along the same line, the instantaneous positions of the respective images on the line corresponding respectively to the amplitudes at the same instant of respective functions being measured, the arrangement being such that the images can cross each other in moving along the line, means for cyclically scanning the line and producing a series of separate electrical signal pulses of the same sign, the spacing of which in each scanning cycle corresponds respectively to the spacing of the scanned images on the line at the instant of scanning, means for interspersing in the series of signal pulses a series of marker pulses of different duration than the signal pulses but of the same sign and each corresponding to the same point in successive scanning cycles, and pulse modulating means for transmitting the resulting combined series of pulses as separate radiated radio frequency pulses.

7. In a telemetering transmitter, the combination which comprises transducers for moving a plurality of optical images simultaneously along the same line, the instantaneous positions of the respective images on the line corresponding respectively to the amplitudes at the same instant of respective functions being measured by the transducers, the transducers being adapted to cause the images to cross each other in moving along the line, means for cyclically scanning the line and producing a series of separate electrical signal pulses of the same polarity, the spacing of which in each scanning cycle corresponds respectively to the spacing of the scanned images on the line at the instant of scanning, and means synchronized with the scanning means for interspersing in the series of signal pulses a series of marker pulses having characteristics which are different from those of the signal pulses.

8. In a telemetering device, the combination which comprises transducers for moving a plurality of optical images simultaneously along the same line, the instantaneous positions of the respective images on the line corresponding respectively to the amplitudes at the same instant of respective functions being measured by the transducers, the transducers being adapted to cause the images to cross each other in moving along the line, means for cyclically scanning the line and producing a series of separate electrical signal pulses of the same sign, the spacing of which in each scanning cycle corresponds respectively to the spacing of the scanned images on the line at the instant of scanning, and means synchronized with the scanning means for interspersing in the series of signal pulses a series of marker pulses of different duration than the signal pulses but of the same sign and each corresponding to the same point in successive scanning cycles.

ROBERT B. MORAN, Jr.

REFERENCES CITED

The following references are of record in the file of this patent:

UNITED STATES PATENTS

| Number | Name | Date |
|---|---|---|
| 1,599,922 | Rathbone | Sept. 14, 1926 |
| 1,660,886 | Randall | Feb. 28, 1928 |
| 1,849,827 | Fitzgerald | Mar. 14, 1932 |
| 2,110,746 | Telson | Mar. 8, 1938 |
| 2,148,954 | Methlin | Feb. 28, 1939 |
| 2,321,971 | Becker | June 15, 1943 |
| 2,407,336 | Young | Sept. 10, 1946 |
| 2,434,936 | Labin | Jan. 27, 1948 |
| 2,444,950 | Nichols | July 13, 1948 |
| 2,468,059 | Grieg | Apr. 26, 1949 |
| 2,468,703 | Hammel | Apr. 26, 1949 |

FOREIGN PATENTS

| Number | Country | Date |
|---|---|---|
| 463,330 | Great Britain | 1937 |